United States Patent [19]
Counts

[11] 4,193,094
[45] Mar. 11, 1980

[54] BIAS BOOST CIRCUIT FOR TELEVISION RECEIVER

[75] Inventor: William H. Counts, Lombard, Ill.

[73] Assignee: Admiral Corporation, Schaumburg, Ill.

[21] Appl. No.: 911,948

[22] Filed: Jun. 2, 1978

[51] Int. Cl.² .............................................. H04N 3/18
[52] U.S. Cl. ................................... 358/190; 358/184; 358/188
[58] Field of Search ......................... 358/184, 188, 190

[56] References Cited

U.S. PATENT DOCUMENTS

| | | | |
|---|---|---|---|
| 3,339,105 | 8/1967 | Busse | 358/188 |
| 3,535,445 | 10/1970 | Griffery | 358/188 |
| 4,127,875 | 11/1978 | Fernsler | 358/190 |
| 4,129,885 | 12/1978 | Chovanel | 358/190 |

*Primary Examiner*—David L. Stewart
*Attorney, Agent, or Firm*—Albert G. Marriott; R. Lewis Gable

[57] ABSTRACT

A bias boost circuit for a television receiver is disclosed, comprising a timing circuit for providing an exponentially decreasing bias to a video amplifier of the television receiver for a period of time corresponding to the initial warmup of the TV receiver, i.e. until the various amplifier and display portions are ready to display a high brightness image. The timing circuit comprises an RC circuit coupled to a power source of the TV receiver, whereby upon turn-on of the TV receiver the source's voltage is applied to the timing circuit, i.e. to its capacitor, to provide a decreasing voltage bias to the base of a transistor, whereby the transistor is gradually turned off thus decreasing exponentially a bias boost signal that is applied to the video amplifier and in particular, to its first stage.

5 Claims, 4 Drawing Figures

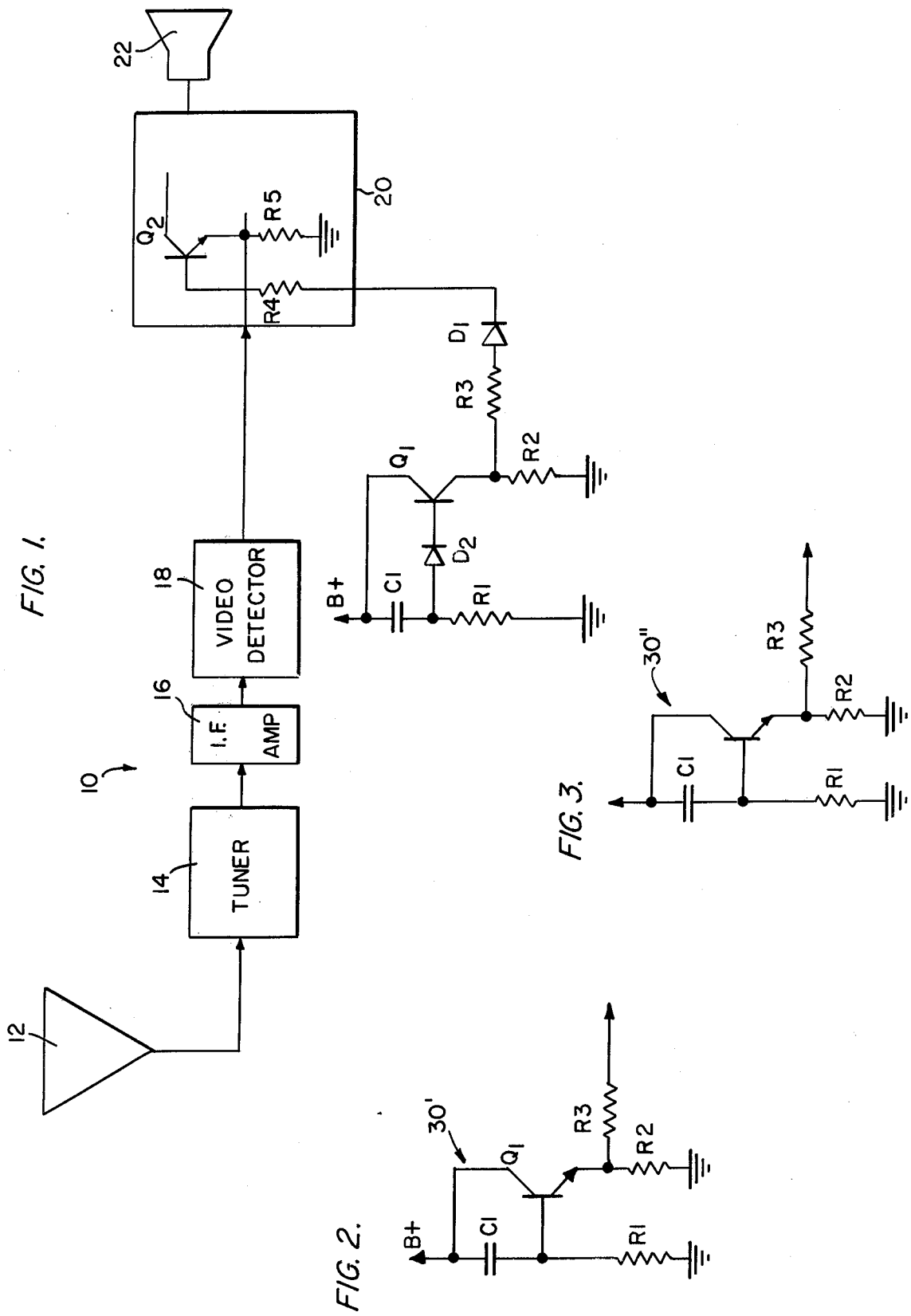

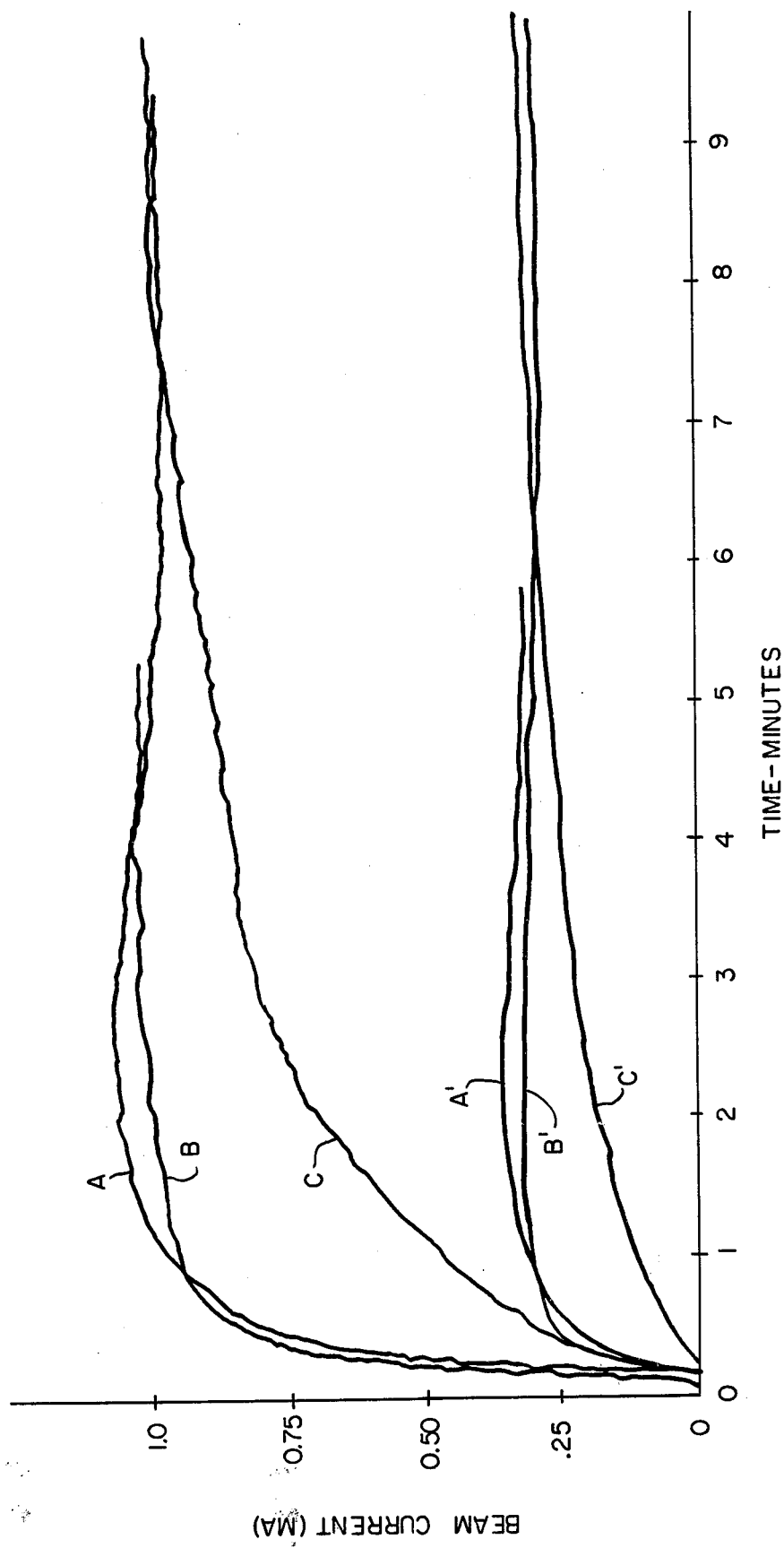

BIAS BOOST CIRCUIT FOR TELEVISION RECEIVER

BACKGROUND OF THE INVENTION

1. Field of the Invention

This invention relates to video signal processing circuits and, in particular, to such circuits for increasing the amplitude of the video signal and in particular for increasing for an initial warm-up period, the biasing voltage to a video amplifier of a TV receiver.

2. Description of the Prior Art

In TV receivers of the prior art, it has been desired to provide a TV image as rapidly as possible after the TV receiver has been turned on. With early TV receivers, the viewer experienced the frustration of turning on the receiver and waiting for a relatively long period of time until the components amplifying the video signal warmed-up to a temperature at which they would amplify sufficiently the video signal, and until the cathode ray tube (CRT) and in particular its cathode element became sufficiently heated so that it would emit the image forming electron beam. An early approach to achieve a rapid display of the TV image involved the continuous application of a current (even when the TV receiver was not otherwise in use) to the cathode heater of the CRT, whereby the cathode element was maintained in a condition to emit electrons upon the activation of the remaining parts of the television receiver. However, the drawback to such a solution was the requirement of a small transformer to apply the heating current to the cathode heater, as well as the continuous application and use of electrical energy to maintain the cathode heater heated.

As it became more desired to conserve electrical energy, the continuous energization of the cathode heater became less desirable. As a result, other methods were developed for minimizing the time required to achieve a TV display. To this end, special CRT's were developed wherein the heater mechanisms were specially designed to achieve a low thermal mass so that they could be rapidly heated to cause the cathodes emissive material to emit within a relatively short period of time. In a further approach, it was suggested to apply additional power to the cathode heater element whereby it would warm-up at an increased rate. However, both of these approaches involved a cathode ray tube that was relatively expensive and whose expected life was shorter than other conventional types television CRT's. In part the reduced life resulted from the fast warm-up of the cathode element whereby repeated thermal stress was applied to the cathode element due to uneven heating; as a result, the cathode elements of such special CRT's tended to mechanically break-down in a shorter period of time.

In addition to some compensation for the time the CRT takes to warm up and its emission to stabilize, it is important that compensation also be provided for the lower current that the video transistors draw until they have warmed up to their operating temperature. This is most important where direct coupled video stages determine the CRT bias, which in turn affects the image displayed upon the CRT.

SUMMARY OF THE INVENTION

It is therefore an object of this invention to provide a new and improved TV receiver wherein the rapid achievement of a high brightness TV image is achieved without resort to making special modifications of the receiver's CRT.

It is a more specific object of this invention to provide a new and improved video signal processing circuit for a TV receiver wherein the video signal is initially amplified to a greater degree after the TV receiver is turned on to initially provide a high brightness TV image.

In accordance with these and other objects of the invention, there is disclosed a bias boost circuit for a TV receiver including a circuit for providing an initially high bias boost to a video amplifier of the TV receiver for a period corresponding to that in which the various elements warm-up to their operating temprature, whereby a TV image of high brightness may be initially displayed. In particular, there is provided a timing circuit coupled to the TV receiver's voltage supply source to establish a timing period corresponding to the warm-up period and during such period, for providing an exponentially decreasing bias boost to a DC coupled video stage of the video amplifier.

In a particular illustrative embodiment of this invention, the bias boost circuit comprises a capacitor coupled in series with a resistor to ground from the receiver's supply voltage. The resistor and capacitor form the timing circuit and their point of interconnection, is connected to the base of a transistor, whose collector is coupled to the voltage supply source and whose emitter is coupled via a resistor to ground. Thus the bias boost signal is derived from the transistor's emitter and is applied to the video amplifier and in particular to its first stage.

In a further feature of this invention, an isolating diode is disposed between the emitter of the transistor and the video amplifier, whereby the bias boost circuit does not load the video amplifier.

In addition, a second diode is coupled between the point of interconnection between the transistor and the capacitor, and the base of the transistor. The second diode serves to prevent the rapid discharge of the capacitor when the TV receiver is turned off, whereby if it is turned on immediately thereafter, the timing circuit is prepared for providing the appropriate amount of exponentially decreasing, boost bias to the video amplifier. This boost is approximately correct to complement the partially cooled elements of the TV receiver.

When the TV receiver is initially turned off, its voltage source is applied to the capacitor charging the capacitor to the DC level of the source over a period depending upon the values of the capacitor and of the resistor connected thereto. Initially, substantially the entire source voltage is applied to the base of the transistors whereby it is rendered fully conductive to apply a maximum boost signal. As the capacitor begins to charge, the potential applied to the base of the transistor decreases whereby the bias boost signal decreases exponentially in a manner to complement for the increasing efficiency of the voltage source and video amplifier. The warm-up timing period is determined by the particular TV receiver including the time required for the video amplifier and voltage source to warm-up and the time period required for the CRT and in particular its cathode element to reach normal electron emitting efficiency.

BRIEF DESCRIPTION OF THE DRAWINGS

These and other objects and advantages of the present invention will become more apparent by referring to the following detailed description accompanying the drawings, in which:

FIG. 1 is a schematic showing in block form of a television receiver, wherein there is included a bias boost circuit in accordance with the teachings of this invention;

FIGS. 2 and 3 show further embodiments of the bias boost circuit of this invention; and FIG. 4 is a graph illustrating the increase in electron beam current of the TV receiver's CRT as a function of time.

DETAILED DESCRIPTION OF THE PREFERRED EMBODIMENT

Referring now to the drawings and in particular to FIG. 1, there is shown a television receiver 10 into which a bias boost circuit in accordance with the teachings of this invention has been incorporated. The TV receiver 10 is illustrated as a black-and-white TV receiver, but it is noted that this invention has equal application to a color TV receiver. The TV receiver 10 includes an antenna 12 coupled to a tuner 14 having the usual RF, IF, oscillator and mixture stages. In turn, the tuner output is applied to an IF amplifier 16, the output of which, in turn, is applied to a video detector 18 which develops, as is well known in the art, a video signal to be amplified by the video amplifier 20. In turn, the amplified video signal as derived from the video amplifier 20 is applied to a cathode ray tube (CRT) 22 of conventional design, i.e. no special cathode element is required.

The bias boost circuit 30 as shown in FIG. 1 provides means for accelerating the turn on of the television receiver and in particular provides a relatively fast display of a high brightness television image upon the CRT 22. The bias boost circuit 30 includes a capacitor C1 that is coupled to the DC power or voltage source, whereby the B+ voltage is applied when the television receiver 10 is turned on, to the capacitor C1, which forms with a resistor R1 an RC timing circuit. In particular, the capacitor C1 is connected between B+ in series with the resistor R1 to ground. In addition, the B+ voltage is also connected to the collector of a transistor Q1 whose base is coupled via the diode D2 to the point of interconnection between the resistor R1 and the capacitor C1. The transistor Q1 is connected as an emitter follower with its output taken from its emitter and applied via the resistor R3 and an isolating diode D1 to the first stage of the video amplifier 20 and in particular to its transistor Q2, as will be explained in detail later.

Briefly in operation, the B+ voltage is then applied to the capacitor C1, the capacitor C1 being initially uncharged, whereby substantially the entire value of the B+ voltage, illustratively 24 volts, is applied via the forward biased diode D2 to the base of transistor Q1. Noting that the collector of the transistor Q1 is also connected to B+ voltage, the transistor Q1 is immediately rendered fully conductive from its base to emitter, thereby bringing the emitter of Q1 to within approximately 0.6 volts of the base of the transistor Q1. Therefore substantially the entire B+ voltage is applied across the resistor R2 and via the series connected resistor R3 and diode D1 to the video amplifier 20 to supply an increased bias potential to its first stage comprising transistor Q2, of the video amplifier 20. As the capacitor C1 charges, the voltage appearing at the point of interconnection between the capacitor C1 and the resistor R1 decreases exponentially, thus rendering the transistor Q1 less conductive whereby the boost bias signal as developed at the emitter of transistor Q1 decreases, also exponentially. The voltage applied to the base of Q1 gradually decreases as the capacitor C1 becomes fully charged dependent upon the chosen values of the capacitor of C1 and resistor R1. This time period is illustratively set to be five to ten minutes dependent upon the particular characteristics of the TV receiver. In particular, the bias boost circuit 30 compensates for the warm-up time of the voltage supply, the video amplifier and the cathode element of the CRT 22. With regard to the warm-up time of the voltage supply and video amplifier 20, it is noted that the transistors, making up these components require a certain period to warm-up from substantially room temperature to a temperature (i.e., the case temperature of the transistor devices) in the range of approximately 50° to 75° C. During this warm-up period, the amplification provided by the video amplifier 20, as well as the output of the voltage supply varies whereby the video signal is not fully amplified to its normal amplitude thus tending to render displayed image dark. Further, the cathode element of the CRT 22 requires a period to warm-up to its operating temperature whereat its electron emissive material is fully efficient to emit an electron beam, which is scanned to form the TV image. During the warm-up period, the cathode element emits an electron beam of increasing current density. Thus, the period of the RC circuit comprised of capacitor C1 and resistor R1 is set as a function of these variables, which are dependent upon the characteristics of the particular TV receiver.

The bias boost circuit 30 without the diodes D1 and D2, whose operation has been described to this point, is shown in FIG. 2. A further modification of this circuit is shown in FIG. 3, wherein the diode D1 is added in order to provide isolation between the bias boost circuit 30" and the video amplifier 20. The diode D1 serves to isolate the bias boost circuit 30" when it has timed out and the boost signal has decreased toward its steady state level at which the television receiver 10 will continue to operate. Without the diode D1, the boost circuit 30' would place an undue load upon the video amplifier 20 thereby tending to reduce its amplification.

The bias boost circuit 30, as shown in FIG. 1, further includes the diode D2, which serves to discharge the capacitor C1 when the set is turned off. It can be seen that a discharge path is established through the diode D2, the base to emitter of the transistor Q1 and the resistor R2 to ground thus tending very rapidly to discharge the capacitor C1. If the diode D2 were not included as shown in the embodiments of FIGS. 2 and 3, the capacitor C1 would be otherwise charged when the set is again turned on after recently being turned off, thereby tending to provide an additional further bias boost to the video amplifier; an excessively bright image for a short period of time would result when the receiver is turned off and on in rapid succession. However if the diode D2 is included, the capacitor C1 is not quickly discharged when the TV receiver 10 is turned off. Thus, when the TV receiver 10 is turned on quickly again, the capacitor C1 is not fully discharged (now partially charged) whereby it applies a controlled voltage approximately equal to that needed to properly boost the partially cooled transistors and other components of the TV receiver 10.

The values of the capacitor C1 and resistor R1 are chosen to set the desired timing period as explained above. The values of the resistors R2 and R3 are set to reduce the voltage appearing at the emitter of the transistor Q1 to provide the desired level of bias boost typically in the order of 0.5 to 1 volt. In this regard, the elements of the bias boost circuit 30 may illustratively be set to the following values:

C1—100 microfarad
R1—3.3 meg ohm
R2—47K ohm
R3—1.2 meg ohm

The details of the video amplifier 20 are not considered to be a part of this invention and are only briefly shown in FIG. 1 as comprising the transistor Q2 which is connected as video emitter follower with an input signal being applied to its emitter, which is connected to ground by a resistor R5. It is understood that the details of the video amplifier 20, as well as the remaining elements of the television receiver 10 are illustratively shown in the color TV chassis 28M55B, as manufactured by the assignee of this invention.

In FIG. 4, there is shown a series of six curves A, B, C, and A', B' and C' illustrating the effects of incorporation of the bias boost circuit 30 into the television receiver 10. CRT's are operated to provide an electron beam of varying current densities and curves A, B and C are illustrative of a CRT cathode element operated to produce a 1 ma current electron beam, whereas curves A', B' and C' illustrate a cathode element operated to provide an electron beam current of 0.3 ma. In particular, curve A indicates the increase of the current density of the electron beam derived from the cathode element of the CRT 22 as a function of time. It is seen from curve A that from a cold start the electron beam current increases exponentially to a substantially steady state value of 1 ma, due to increased bias boost signal derived from the bias boost circuit 30 of this invention. Curve B illustrates a similar exponentially increasing electron beam current for the situation where the receiver 10 has been turned "off" and "on" in rapid succession; in particular, curve B illustrates the effect of including the diode D2 into the bias boost circuit 30 to prepare the circuit 30 to provide a bias boost signal that is not excessive when the receiver is rapidly turned "off" and then "on." Curve C illustrates a significantly slower increase of electron beam current where the bias boost circuit 30 of this invention is not incorporated. Curves A', B' and C' illustrate similar curves under conditions similar to those of curves A, B and C, wherein the electron beam current is increased toward 0.3 ma. Thus the curves of FIG. 4 illustrate that the bias boost circuit of this invention is effective to increase rapidly the electron beam current toward a relatively high current value, i.e. 1 ma, and toward a relatively low current value, i.e. 0.3 ma, to achieve a "quick on" effect in terms of rapidly displaying a high brightness TV image upon the CRT 22.

In FIG. 1, it is illustratively described that the bias boost circuit 30 is coupled to the initial stage of the video amplifier 20. However, it is contemplated that the output of the bias boost circuit 30 could be applied to a clamping circuit circuit as described in U.S. Pat. No. 4,091,419 to set the DC bias of the video signal in accordance with the sync signal appearing in the horizontal blanking interval. In this manner, the DC level of the signal would be increased initially for a selected period dependent upon the characteristics of the television receiver 10 to permit an appropriate warm-up of the cathode element of the CRT, as well as the transistor elements of the DC coupled video amplifier. However, it is preferred to apply the bias boost signal derived from the circuit 30, in that the bias boost signal is applied at an earlier stage of the video signal processing and thus serves to warm up or stabilize a greater proportion of the elements of the TV receiver.

Numerous changes may be made in the above-described apparatus and the different embodiments of the invention may be made without departing from the spirit thereof; therefore it is intended that all matter contained in the foregoing description and in the accompanying drawings shall be interpreted as illustrative and not in a limiting sense.

What is claimed is:

1. In a television receiver having a cathode ray tube (CRT) with a cathode element for emitting an electron beam to be scanned in raster fashion to provide an image, an image-processing circuit comprising:
   (a) a source of an image representative video signal;
   (b) video signal processing means for providing a processed video signal from its output to said cathode element of said CRT;
   (c) means responsive to the energization of said television receiver for providing a bias boost signal for a selected inital period of time to said processing means whereby its output is increased in accordance with the bias boost signal, said period selected dependent upon the time required for said cathode element of said CRT to emit an electron beam of steady state current density and for said processing means to reach a steady state amplifying condition; said bias boost signal decreasing from an initially high level to a steady state level at the end of said selected period, whereby the brightness of the TV images is enhanced for the selected period; and
   (d) said bias boost providing means comprises a timing circuit for initiating the timing upon energization of said television receiver for the selected period and for discontinuing the providing of the bias boost signal upon the completion of said selected period, said timing circuit comprises a first resistor and a capacitor, the impedance of said resistor and said capacitor being selected to establish said selected period; a power supply circuit, and said capicitor being coupled to said supply circuit so that upon energization of said television receiver said timing circuit initiates its timing operation; a transistor having a base connected to the point of interconnection between said first resistor and said capacitor; and means for preventing the rapid discharge of said capacitor when said television receiver is de-energized.

2. The image processing circuit as claimed in claim 1, wherein said discharging means comprises a first diode interconnected between said point of interconnection of said resistor and said capacitor, and the base of said transistor.

3. The image processing circuit as claimed in claim 1, wherein there is included isolating means for isolating the output of said bias boost providing means as derived from said emitter of said transistor, and said processing means.

4. The image processing circuit as claimed in claim 3, wherein said isolating means comprises a second diode.

5. The image processing circuit as claimed in claim 1, wherein said emitter of said transistor is connected by a second resistor to ground and said emitter is coupled via a third resistor to said processing means, the impedances of said second resistor and said third resistor being selected to provide a bias boost signal of an appropriate amplitude to said processing means.

* * * * *